United States Patent
Ouchida et al.

(10) Patent No.: US 9,005,058 B2
(45) Date of Patent: Apr. 14, 2015

(54) BELT-TYPE STEPLESS TRANSMISSION

(75) Inventors: Takeshi Ouchida, Osaka (JP); Fumitoshi Ishino, Osaka (JP); Shuji Shiozaki, Osaka (JP)

(73) Assignees: Yanmar Co., Ltd., Osaka (JP); Kanzaki Kokyukoki Mfg. Co., Ltd., Hyogo (JP)

(*) Notice: Subject to any disclaimer, the term of this patent is extended or adjusted under 35 U.S.C. 154(b) by 281 days.

(21) Appl. No.: 13/500,807

(22) PCT Filed: Jun. 9, 2010

(86) PCT No.: PCT/JP2010/059788
§ 371 (c)(1),
(2), (4) Date: May 9, 2012

(87) PCT Pub. No.: WO2011/043105
PCT Pub. Date: Apr. 14, 2011

(65) Prior Publication Data
US 2012/0214627 A1    Aug. 23, 2012

(30) Foreign Application Priority Data

Oct. 8, 2009  (JP) ................................ 2009-234597
Oct. 8, 2009  (JP) ................................ 2009-234598
Oct. 8, 2009  (JP) ................................ 2009-234599

(51) Int. Cl.
*F16H 59/00*    (2006.01)
*F16H 61/00*    (2006.01)
(Continued)

(52) U.S. Cl.
CPC ............ *F16H 61/66272* (2013.01); *F16H 9/18* (2013.01); *F16H 55/56* (2013.01)

(58) Field of Classification Search
CPC ............... F16H 55/56; F16H 61/6625; F16H 61/66272; F16H 9/16; F16H 63/067
USPC ..................................................... 474/119, 19
See application file for complete search history.

(56) References Cited

U.S. PATENT DOCUMENTS 2,283,392 A * 5/1942 Shadrick ........................ 474/21
2,900,834 A * 8/1959 Bessette ........................ 474/19
(Continued)

FOREIGN PATENT DOCUMENTS

EP    1 406 030 A2    4/2003
EP    1406030 A2    4/2004
(Continued)

OTHER PUBLICATIONS

International Search Report for PCT/JP2010/059788, Japanese Patent Office, mailed Sep. 7, 2010, 6 pages.
(Continued)

*Primary Examiner* — Henry Liu
(74) *Attorney, Agent, or Firm* — Sterne, Kessler, Goldstein & Fox P.L.L.C.

(57) ABSTRACT

A belt-type stepless transmission is provided with: an input shaft; an input pulley having a stationary sheave and a movable sheave; a transmission shaft disposed parallel to the input shaft; an output pulley having a stationary sheave and a movable sheave; a belt wound around the input pulley and the pulley; an output shaft disposed coaxially with the transmission shaft; and a cam mechanism having a sheave-side cam which is provided and affixed to the movable sheave and a shaft-side cam which is provided and affixed to the output shaft and causing the sheave-side cam and the shaft-side cam to make contact with each other to thereby enable the transmission of torque between the movable sheave and the output shaft and apply an axial pressing force corresponding to the torque to the movable sheave.

2 Claims, 10 Drawing Sheets

(51) Int. Cl.
    *F16H 63/00*     (2006.01)
    *F16H 61/662*     (2006.01)
    *F16H 9/18*     (2006.01)
    *F16H 55/56*     (2006.01)

(56) References Cited

U.S. PATENT DOCUMENTS

| | | | | |
|---|---|---|---|---|
| 3,161,071 | A * | 12/1964 | Getz | 474/19 |
| 3,195,364 | A * | 7/1965 | Pauli | 474/19 |
| 3,279,270 | A * | 10/1966 | Pacak | 474/19 |
| 3,616,706 | A * | 11/1971 | Shimamoto | 74/19 |
| 3,722,308 | A * | 3/1973 | Steuer | 474/19 |
| 3,842,637 | A * | 10/1974 | Wilson | 474/19 |
| 4,033,195 | A * | 7/1977 | Takagi et al. | 474/19 |
| 4,173,155 | A * | 11/1979 | Togami et al. | 474/19 |
| 4,378,221 | A * | 3/1983 | Huff et al. | 474/19 |
| 4,523,917 | A * | 6/1985 | Schildt | 474/19 |
| 4,585,429 | A * | 4/1986 | Marier | 474/12 |
| 4,592,737 | A * | 6/1986 | Dhont | 474/19 |
| 4,826,467 | A | 5/1989 | Reese et al. | |
| 4,976,657 | A * | 12/1990 | Takano | 474/13 |
| 5,403,240 | A * | 4/1995 | Smith et al. | 474/8 |
| 5,516,333 | A * | 5/1996 | Benson | 474/19 |
| 6,413,178 | B1 * | 7/2002 | Chamberland | 474/19 |
| 6,755,759 | B2 * | 6/2004 | Blanchard | 474/19 |
| 6,958,025 | B2 * | 10/2005 | Huddleston | 474/19 |
| 6,997,833 | B2 * | 2/2006 | Labbe | 474/19 |
| 7,179,183 | B2 | 2/2007 | Borghi | |
| 7,901,308 | B2 * | 3/2011 | Binello et al. | 474/19 |
| 8,272,981 | B2 * | 9/2012 | Galletti et al. | 474/19 |
| 2002/0123400 | A1 * | 9/2002 | Younggren et al. | 474/14 |
| 2002/0183145 | A1 * | 12/2002 | Blanchard | 474/19 |
| 2003/0054909 | A1 * | 3/2003 | Flaspeter | 474/19 |
| 2004/0142781 | A1 * | 7/2004 | Huddleston | 474/19 |
| 2004/0266570 | A1 * | 12/2004 | Kalies | 474/19 |
| 2005/0043128 | A1 * | 2/2005 | Zulawski | 474/19 |
| 2005/0209032 | A1 * | 9/2005 | Aitcin | 474/19 |
| 2005/0239585 | A1 * | 10/2005 | Nishida et al. | 474/19 |
| 2007/0015616 | A1 * | 1/2007 | Teijido et al. | 474/19 |
| 2007/0105671 | A1 * | 5/2007 | Binello et al. | 474/19 |
| 2008/0102998 | A1 * | 5/2008 | Teijido et al. | 474/19 |
| 2009/0042678 | A1 * | 2/2009 | Labbe | 474/19 |
| 2009/0156338 | A1 * | 6/2009 | Galletti et al. | 474/19 |

FOREIGN PATENT DOCUMENTS

| | | |
|---|---|---|
| JP | S47-039196 U | 11/1972 |
| JP | S62-131146 U | 8/1987 |
| JP | H02-091245 U | 7/1990 |
| JP | H05-040354 Y2 | 10/1993 |
| JP | 2000-009193 A | 1/2000 |
| JP | 2000-027960 A | 1/2000 |
| JP | 2002 227949 A | 8/2002 |
| JP | 2006-291999 A | 10/2006 |
| JP | 2008-064125 A | 3/2008 |

OTHER PUBLICATIONS

Notice of Reasons for Refusal in JP 2009-234597, Japanese Patent Office, issued Aug. 6, 2013, 4 pages (with English Translation).
Extended European Search report for corresponding Application No. EP 10 82 1777.9 dated Oct. 1, 2014, seven (7) pages.

* cited by examiner

Fig. 10
(a)
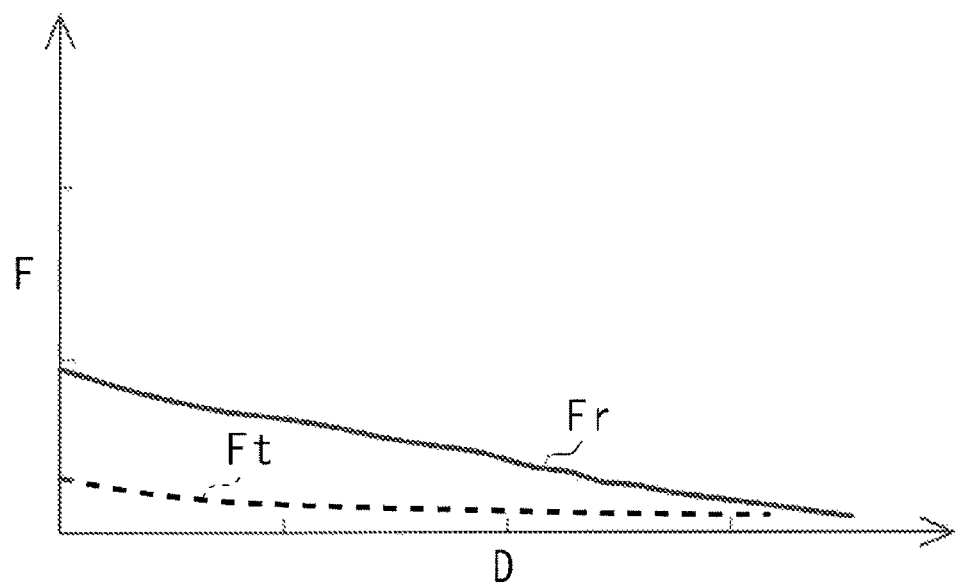
(b)
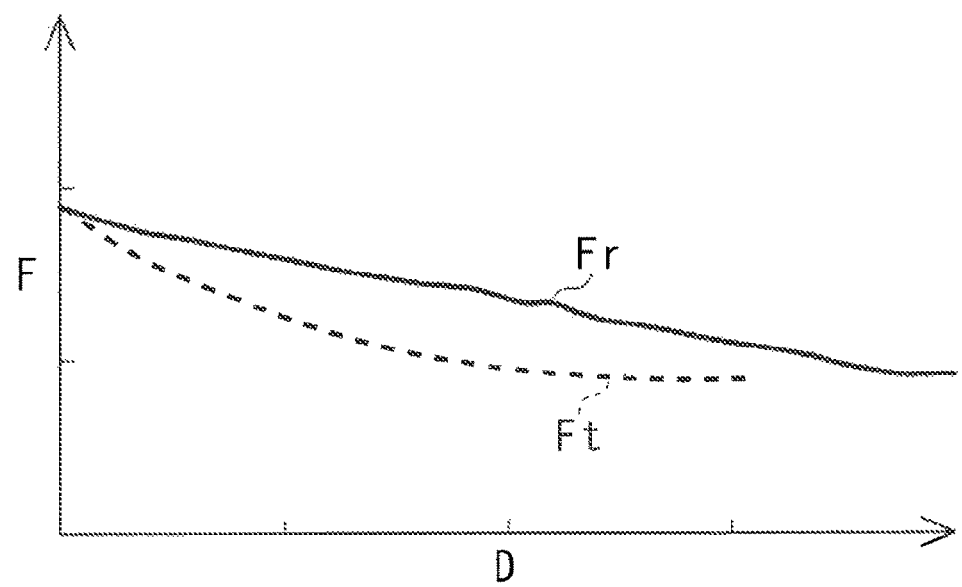

BELT-TYPE STEPLESS TRANSMISSION

TECHNICAL FIELD

The present invention relates to an art of a belt-type stepless transmission in which a belt is wound round a pair of pulleys whose widths of grooves are variable so as to transmit power. In more detail, the present invention relates to an art of a belt-type stepless transmission having a cam mechanism which controls a pressing power of pulleys on a belt corresponding to a transmitted torque.

BACKGROUND ART

Conventionally, an art described in the Patent Literature 1 is known as an art of a belt-type stepless transmission in which a belt is wound round a pair of pulleys whose widths of grooves are variable so as to transmit power.

The belt-type stepless transmission described in the Patent Literature 1 has a cam mechanism which controls a pressing power of pulley on a belt corresponding to a transmitted torque. The cam mechanism includes a pair of cams fixed respectively to a movable sheave and a transmission shaft which are provided in the pulley, a cam roller arranged between the cams so as to touch the cams always, and an elastic member applying power on the cams so as to rotate the cams along a predetermined direction. In this construction, a torque transmitted from the pulley is transmitted via the cam roller to a power transmission shaft. By the cams and the cam roller, the pressing power of the pulley on the belt can be controlled corresponding to the transmitted torque.

However, the belt-type stepless transmission described in the Patent Literature 1 requires members such as the pair of the cams, the cam roller and the elastic member, thereby being disadvantageous because the structure is complicated and the production cost and the part cost are high.

PRIOR ART REFERENCE

Patent Literature

Patent Literature 1: the Japanese Patent Laid Open Gazette 2006-291999

DISCLOSURE OF INVENTION

Problems to be Solved by the Invention

The present invention is provided in consideration of the problems mentioned above and provides a belt-type stepless transmission whose cam mechanism can be constructed easily.

Means for Solving the Problems

The above-mentioned problems are solved by the following means according to the present invention.

According to the present invention, a belt-type stepless transmission includes an first shaft, an first pulley having a first stationary sheave fixed to the first shaft and a first movable sheave supported on the first shaft so as to be slidable along the axis of the first shaft and so as not to be rotatable relatively with respect to the first shaft, a second shaft arranged in parallel to the first shaft, a second pulley having a second stationary sheave fixed to the second shaft and a second movable sheave supported on the second shaft so as to be slidable along the axis of the second shaft and so as not to be rotatable relatively with respect to the second shaft, a belt wound round the first pulley and the second pulley, an third shaft arranged on the same axis as the second shaft, and a cam mechanism which has a sheave-side cam fixed to the second movable sheave and a shaft-side cam fixed to the third shaft and makes the sheave-side cam and the shaft-side cam touch with each other so as to enable transmission of a torque between the second movable sheave and the third shaft and to apply a biasing force corresponding to the torque on the second movable sheave.

According to the present invention, the sheave-side cam and the shaft-side cam respectively have first surfaces which are slanted for a predetermined angle with respect to a plane perpendicular to an axis of the second shaft, and can touch with each other via the first surfaces.

According to the present invention, the sheave-side cam and the shaft-side cam respectively have second surfaces which are slanted oppositely to the first surfaces with respect to the plane perpendicular to the axis of the second shaft, and can touch with each other via the second surfaces.

According to the present invention, the sheave-side cam and the shaft-side cam are constructed by one member.

According to the present invention, the first stationary sheave and the second stationary sheave are formed separately respectively from the corresponding first and second shafts and connected to the shafts so as not to be rotatable relatively.

According to the present invention, the first stationary sheave and the second stationary sheave are fixed to the first and second shafts so as not to be rotatable relatively by engaging through-holes, which are formed in the first stationary sheave and the second stationary sheave and have tapered inner peripheral surfaces, with tapered parts formed on outer peripheral surfaces of the first and second shafts.

According to the present invention, the first stationary sheave and the second stationary sheave are constructed by one member.

According to the present invention, the first movable sheave and the second movable sheave are constructed by one member.

According to the present invention, the belt-type stepless transmission according to claim 1, further includes a spring biasing the second movable sheave toward the second stationary sheave. The third shaft has double cylinder construction including an inner cylinder and an outer cylinder surrounding the inner cylinder at a distance along a radial direction. One of sides of the second shaft is inserted into the inner cylinder and guided and supported so as to be movable along an axial direction and so as to be rotatable, and the spring is inserted between the outer cylinder and the inner cylinder and supported so as to be able to extend and retract along the axial direction.

According to the present invention, the shaft-side cam is formed to be ring-like shape into which the spring can be inserted and is fixed to an end of the outer cylinder of the third shaft.

Effect of the Invention

The present invention constructed as the above brings the following effects.

According to the present invention, the cam mechanism applying the biasing force corresponding to the transmission torque on the second movable sheave can be constructed easily.

According to the present invention, the sheave-side cam and the shaft-side cam can be formed easily, whereby the production cost can be reduced.

According to the present invention, the biasing force corresponding to the transmission torque of each of forward and rearward rotational directions can be applied on the second movable sheave. The biasing forces applied on the second movable sheave at the time of the forward and rearward rotation can be set optionally respectively by changing the slant angle of the first surfaces and the second surfaces. The cam mechanism applying the biasing force corresponding to the transmission torque of both the rotational directions on the second movable sheave can be constructed easily.

According to the present invention, the sheave-side cam and the shaft-side cam are served by the same member, whereby the part cost can be reduced.

According to the present invention, in the case in which the shafts and the stationary sheaves are formed by cutting processing, the uselessness of cutting can be reduced. Accordingly, compared with the case of forming the shaft and the stationary sheave integrally, the production cost can be reduced. In the case of producing relative small number of the belt-type stepless transmissions, the separate forming of the stationary sheave and the shaft can reduce the production cost further than the integral forming of the stationary sheave and the shaft. Furthermore, when the pulleys should be exchanged, the exchange can be performed for every sheave, whereby the part cost can be reduced in comparison with the case of forming the shaft and the stationary sheave integrally.

According to the present invention, the production cost can be reduced in comparison with the case of fixing the stationary sheaves to the case with a spline or a serration.

According to the present invention, the two stationary sheaves are served by the same member, whereby the part cost can be reduced.

According to the present invention, the two movable sheaves are served by the same member, whereby the part cost can be reduced.

According to the present invention, the structure between the pulley and the second shaft can be made easy. Accordingly, the production cost and the trouble of production can be reduced. The spring and the first shaft are arranged along the second shaft. Accordingly, the spring and the first shaft can be supported stably.

According to the present invention, the cam mechanism can be arranged compactly between the pulley and the second shaft so as to make the construction between the pulley and the second shaft easy. Accordingly, the production cost and the trouble of production can be reduced.

BRIEF DESCRIPTION OF DRAWINGS

FIG. 10 A diagram of relation between the diameter of the output pulley and the indentation power. (a) is a diagram of the case in which the transmission torque is small. (b) is a diagram of the case in which the transmission torque is large.

Figure 1:
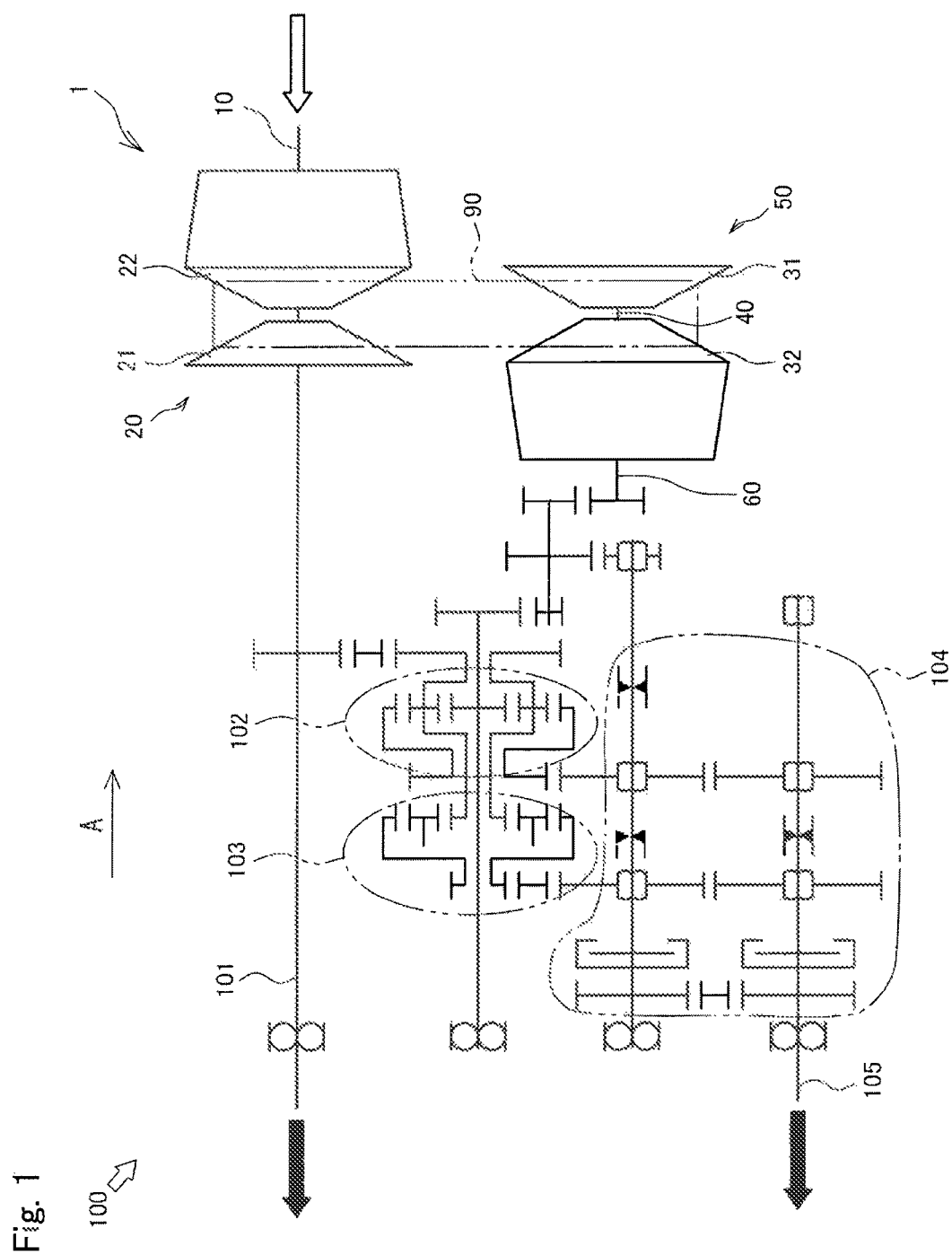
FIG. 1 A schematic drawing of entire construction of a transmission having a belt-type stepless transmission according to an embodiment of the present invention.

DESCRIPTION OF NOTATIONS 1 belt-type stepless transmission
10 input shaft (first shaft)
20 input pulley (first pulley)
21 stationary sheave (first stationary sheave)
22 movable sheave (first movable sheave)
40 transmission shaft (second shaft)
50 output pulley (second pulley)
51 stationary sheave (second stationary sheave)
52 movable sheave (second movable sheave)
60 output shaft (third shaft)
61 outer cylinder
62 inner cylinder
70 spring
80 cam mechanism
81 sheave-side cam
82 shaft-side cam
90 belt
100 transmission

DETAILED DESCRIPTION OF THE INVENTION

Explanation will be given on a transmission 100 having a belt-type stepless transmission 1 which is an embodiment of the present invention. The transmission 100 according to the embodiment is provided in a tractor which is an agricultural vehicle. However, the present invention is not limited thereto and can be employed generally for vehicles such as another agricultural vehicle, construction vehicle and industrial vehicle. In below explanation, a direction of an arrow A in the drawing is defined as the front direction.

The transmission 100 changes power from an engine in speed and then outputs it. The transmission 100 includes the belt-type stepless transmission 1, a PTO output shaft 101, a planetary gear mechanism 102, a planetary gear mechanism 103, a sub transmission mechanism 104, a driving output shaft 105 and the like.

The belt-type stepless transmission 1 changes the transmitted power in speed and then outputs it. The belt-type stepless transmission 1 includes an input shaft 10, an input pulley 20, a belt 90, an output pulley 50, a transmission shaft 40, an output shaft 60 and the like.

The power from the engine is transmitted to the input shaft 10. The power transmitted to the input shaft 10 is transmitted to the output shaft 60 via the input pulley 20, the belt 90, the output pulley 50 and the transmission shaft 40. By controlling the widths of grooves of the input pulley 20 and the output pulley 50, the speed change ratio of the power with the belt-type stepless transmission 1 can be changed steplessly.

The PTO output shaft 101 is arranged coaxially with the input shaft 10 and is rotated interlockingly with the input shaft 10 so as to transmit the power. The power from the PTO output shaft 101 is transmitted to a PTO shaft which takes out power for driving various working machines connected to the tractor.

The planetary gear mechanism 102 and the planetary gear mechanism 103 compose the power transmitted from the output shaft 60 of the belt-type stepless transmission 1 and the power transmitted from the PTO output shaft 101, and then output it.

The sub transmission mechanism 104 changes the power, which is transmitted from the belt-type stepless transmission 1, the planetary gear mechanism 102 or the planetary gear mechanism 103, in speed and then outputs it. The sub transmission mechanism 104 has various gears and clutches and can output the transmitted power forwardly or reversely.

The driving output shaft 105 transmits the power from the sub transmission mechanism 104. The power from the driving output shaft 105 is transmitted via a final reduction mechanism and the like to the wheels of the tractor.

In the transmission 100 constructed as mentioned above, the power from the engine is changed in speed with the belt-type stepless transmission 1, the planetary gear mechanism 102, the planetary gear mechanism 103 and the sub transmission mechanism 104, and then outputted via the driving output shaft 105. The power rotates the wheels of the tractor, whereby the tractor travels forward or rearward. By changing the speed change ratio of the power with the belt-type stepless transmission 1, the speed of the tractor can be changed optionally.

The transmission 100 according to the embodiment has the planetary gear mechanism 102, the planetary gear mechanism 103, the sub transmission mechanism 104 and the like. However, the transmission 100 which can employ the belt-type stepless transmission according to the present invention is not limited thereto, and the belt-type stepless transmission can be employed widely in a transmission 100 which changes power from a drive source in speed and then outputs it.

Explanation will be given on the belt-type stepless transmission 1 in detail referring to FIGS. 2 to 10. The belt-type stepless transmission 1 includes the input shaft 10, the input pulley 20, a hydraulic cylinder 30, the transmission shaft 40, the output pulley 50, the output shaft 60, a spring 70, a cam mechanism 80, the belt 90 and the like.

Figure 2:
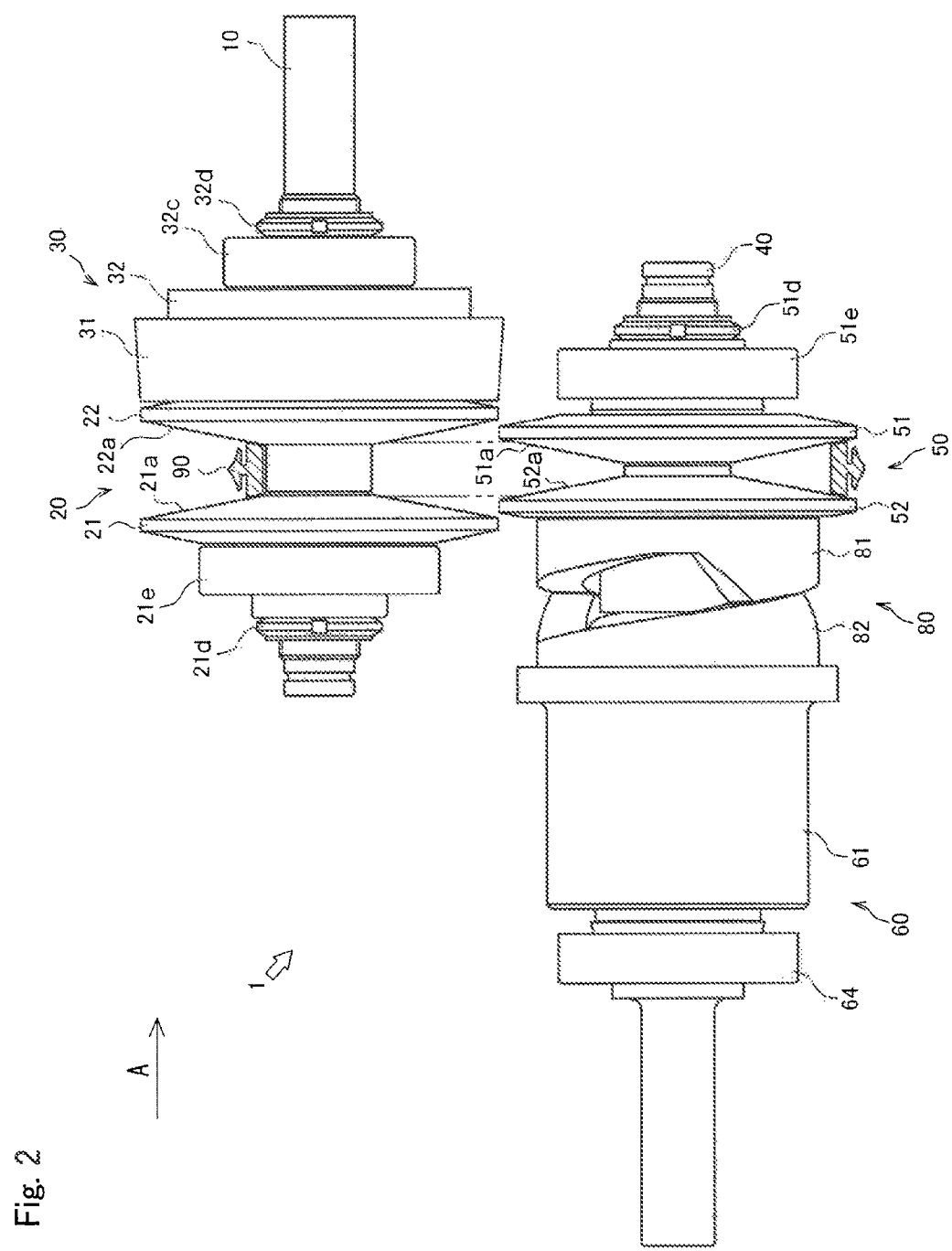
FIG. 2 A side view of the belt-type stepless transmission.
Figure 3:
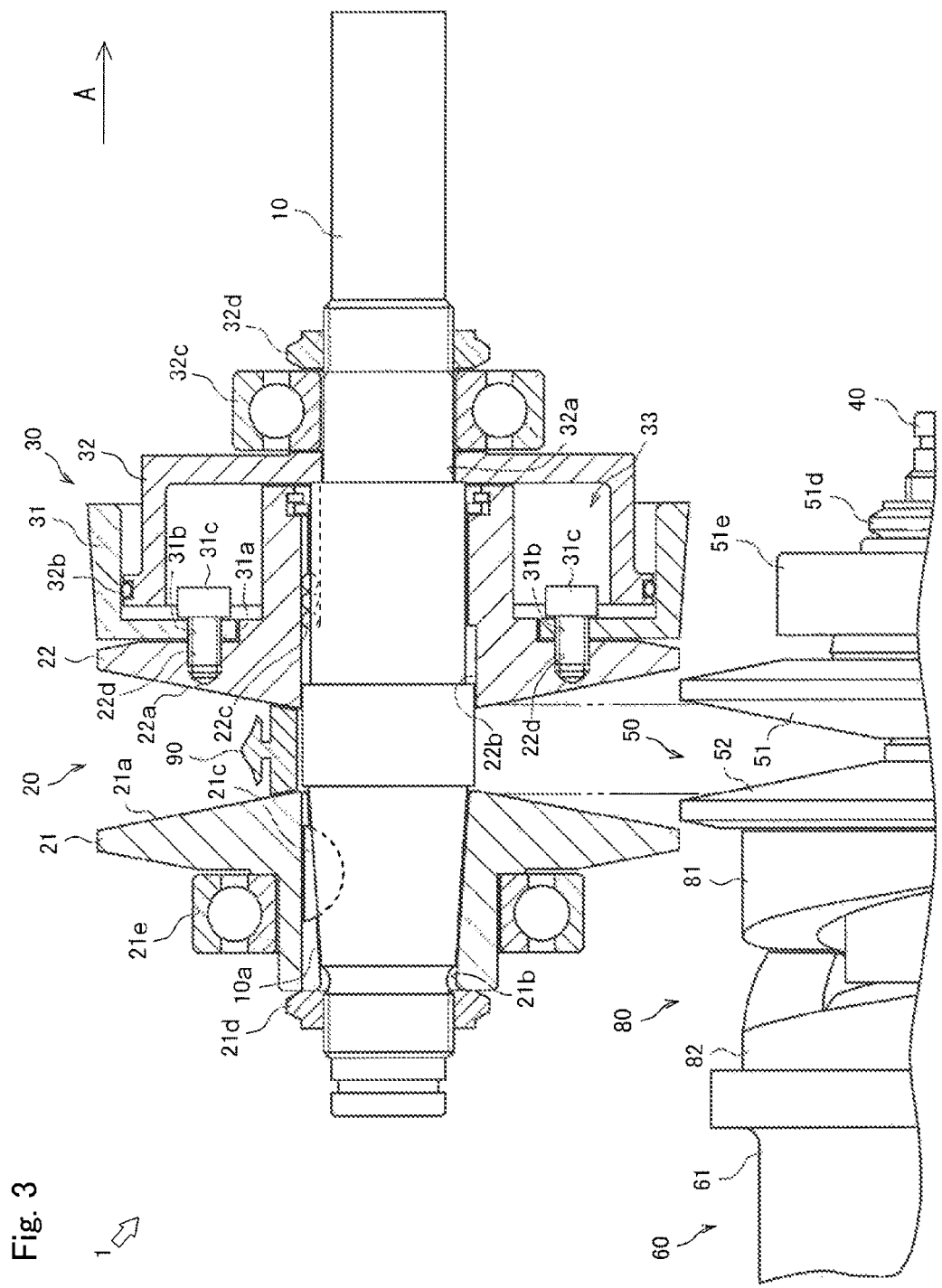
FIG. 3 A sectional side view of an input side of the belt-type stepless transmission.

As shown in FIGS. 2 and 3, the input shaft 10 is connected to the engine and transmits the power from the engine. The input shaft 10 is arranged so that the axis thereof is along the longitudinal direction. A tapered part 10a in which the diameter of the input shaft 10 becomes small from the front side to the rear side is formed in the vicinity of the rear end of the input shaft 10.

The input pulley 20 is arranged on the input shaft 10 and has a pair of sheaves. The input pulley 20 has a stationary sheave 21, a movable sheave 22 and the like.

The stationary sheave 21 has a bushing part which is substantially cylindrical and a sheave part which is formed integrally at the front end of the bushing part and is circular and trapezoidal in sectional side view. The stationary sheave 21 is engaged with the outside of the tapered part 10a of the input shaft 10 while the sheave part is arranged before the bushing part. A front surface 21a of the sheave part of the stationary sheave 21 is formed as a slanted surface whose diameter becomes large from the front side to the rear side. On the axis of the stationary sheave 21, a through-hole 21b is formed which penetrates the stationary sheave 21 longitudinally. The inner peripheral surface of the through-hole 21b is tapered so that the diameter of the through-hole 21b becomes small from the front side to the rear side. The input shaft 10 is inserted into the through-hole 21b of the stationary sheave 21 from the front side. The tapered part 10a of the input shaft 10 is engaged with the tapered through-hole 21b, whereby the stationary sheave 21 is fixed so as not to be rotatable relatively with respect to the input shaft 10 and not to be slidable.

By fixing the stationary sheave 21 to the input shaft 10 by the taper, the production cost can be reduced in comparison with fixation by a spline or a serration. Furthermore, play of the engagement of the stationary sheave 21 and the input shaft 10 can be solved, whereby change of the speed change ratio of the power with the belt-type stepless transmission 1 and reduction of durability of the connection surface between the belt 90 and the stationary sheave 21 can be prevented.

A groove is formed in each of the inner peripheral surface of the through-hole 21b and the outer peripheral surface of the tapered part 10a, and a woodruff key 21c is arranged in the groove. Accordingly, when the input shaft 10 and the stationary sheave 21 are going to be rotated relatively for any reason, the woodruff key 21c is engaged with the groove so as to prevent the relative rotation of the input shaft 10 and the stationary sheave 21.

Just behind the stationary sheave 21, a locknut 21d is screwed on the input shaft 10. Accordingly, the rearward sliding of the stationary sheave 21 on the input shaft 10 and the relative rotation of the stationary sheave 21 and the input shaft 10 can be prevented, whereby the stationary sheave 21 can be fixed to the input shaft 10 certainly.

The bushing part of the stationary sheave 21 is inserted into a bearing 21e and is supported via the bearing 21e so as to be rotatable with respect to a transmission casing (not shown).

As mentioned above, by separating the stationary sheave 21 and the input shaft 10 from each other, only the stationary sheave 21 can be replaced when the stationary sheave 21 is damaged, whereby part replacement cost can be reduced in comparison with the case in which the stationary sheave 21 and the input shaft 10 are constructed integrally. When the input shaft 10 and the stationary sheave 21 are formed by cutting processing, the uselessness of the cutting in the processing can be reduced in comparison with the case in which the stationary sheave 21 and the input shaft 10 are constructed integrally. Accordingly, the production cost can be reduced.

The movable sheave 22 has a bushing part which is substantially cylindrical and a sheave part which is formed integrally at the front end of the bushing part and is circular and trapezoidal in sectional side view. The movable sheave 22 is engaged with a part of the input shaft 10 before the tapered part 10a while the sheave part is arranged behind the bushing part. A rear surface 22a of the sheave part of the movable sheave 22 is formed as a slanted surface whose diameter becomes large from the rear side to the front side. On the axis of the movable sheave 22, a through-hole 22b is formed which penetrates the movable sheave 22 longitudinally. The input shaft 10 is inserted into the through-hole 22b of the movable sheave 22 from the rear side. The front surface 21a of the sheave part of the stationary sheave 21 faces the rear surface 22a of the sheave part of the movable sheave 22 on the input shaft 10, whereby the groove of the input pulley 20 is formed by the front surface 21a and the rear surface 22a. Grooves are formed on each of the inner peripheral surface of the through-hole 22b and the outer peripheral surface of the input shaft 10 along the axis of the input shaft 10. The grooves are formed at three positions along the perimeter of each of the inner peripheral surface of the rear surface 22b and the outer peripheral surface of the input shaft 10 at regular intervals, and a steel ball 22c is arranged in the pair of grooves facing each other. Accordingly, the movable sheave 22 is supported so as to be slidable along the axis of the input shaft 10 and so as not to be rotatable relatively with respect to the input shaft 10. Tapped holes 22d are formed in the front surface of the sheave part of the movable sheave 22. The tapped holes 22d are formed at four positions along the perimeter of the movable sheave 22 at regular intervals.

In the present invention, the intervals between the grooves are not limited to be regular, and the number of the grooves and the number of the tapped holes 22d are not limited to the numbers mentioned above.

The hydraulic cylinder 30 slides the movable sheave 22 on the input shaft 10 along the axis of the input shaft 10. The hydraulic cylinder 30 has a movable side cylinder casing 31, a stationary side cylinder casing 32 and the like.

The movable side cylinder casing 31 is a box-like member whose front side is opened. A through-hole 31a is formed at the center of rear surface of the movable side cylinder casing 31 along the axial direction of the movable side cylinder casing 31, and the bushing part of the movable sheave 22 is inserted into the through-hole 31a. Through-holes 31b are formed in the movable side cylinder casing 31 around the through-hole 31a along the axial direction. The through-holes 31b are formed at four positions along the perimeter of the movable side cylinder casing 31 at regular intervals.

In the present invention, the intervals between the through-holes 31b are not limited to be regular, and the number of the through-holes 31b is not limited to four.

The front surface of the sheave part of the movable sheave 22 touches the rear surface of the movable side cylinder casing 31 so as to make the through-holes 31b overlap the tapped holes 22d, and then bolts 31c are screwed through the through-holes 31b into the tapped holes 22d, whereby the movable side cylinder casing 31 is fixed to the movable sheave 22.

The stationary side cylinder casing 32 is a box-like member whose rear side is opened. A through-hole 32a is formed at the center of rear surface of the stationary side cylinder casing 32 along the axial direction of the stationary side cylinder casing 32, and the input shaft 10 is inserted into the through-hole 32a. The rear portion of the stationary side cylinder casing 32 is inserted into the movable side cylinder casing 31 through the opened side (front side) of the movable side cylinder casing 31. A sealing member 32b is arranged between the stationary side cylinder casing 32 and the movable side cylinder casing 31.

Just before the stationary side cylinder casing 32, the input shaft 10 is inserted into a bearing 32c and is supported via the bearing 32c so as to be rotatable relatively with respect to the transmission casing (not shown).

Just before the bearing 32c, a locknut 32d is fastened to the input shaft 10. Accordingly, the bearing 32c is prevented from sliding forward, and the stationary side cylinder casing 32 is prevented from sliding forward via the bearing 32c.

In the hydraulic cylinder 30 constructed as mentioned above, a hydraulic chamber 33 is formed in a space blocked up by the movable sheave 22, the movable side cylinder casing 31 and the stationary side cylinder casing 32. By pressingly sending pressure oil to the hydraulic chamber 33 via a hydraulic passage (not shown), the movable side cylinder casing 31 is slid rearward on the input shaft 10. Namely, the hydraulic cylinder 30 extends. At this state, the pressure oil is enabled to be discharged from the hydraulic chamber 33 and then the movable side cylinder casing 31 is biased forward, whereby the movable side cylinder casing 31 is slid forward on the input shaft 10. Namely, the hydraulic cylinder 30 retracts.

Figure 4:
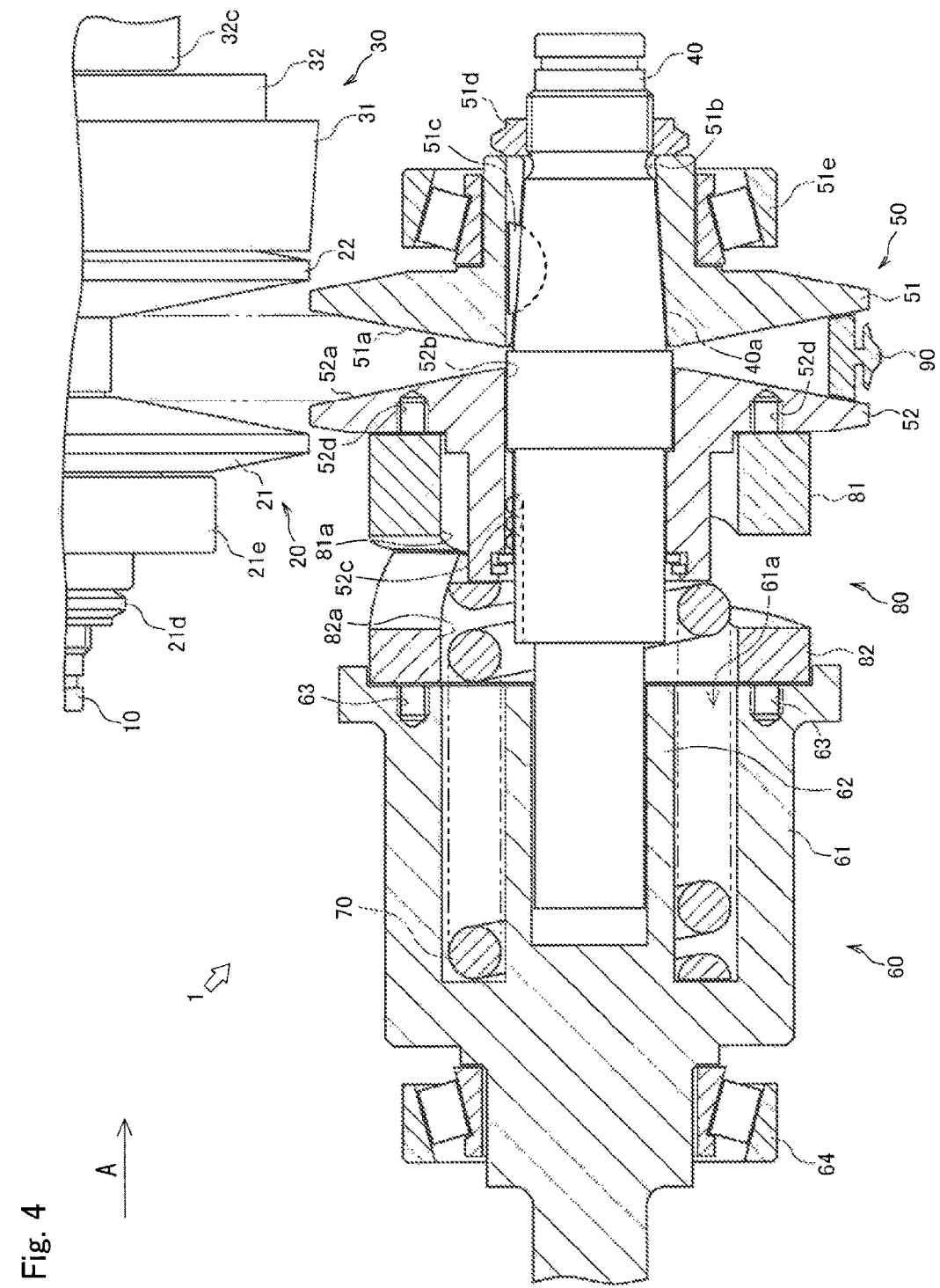
FIG. 4 A sectional side view of an output side of the belt-type stepless transmission.

As shown in FIGS. 2 and 4, the transmission shaft 40 is arranged in parallel to the input shaft 10 while the axis of the transmission shaft 40 is along the longitudinal direction. A tapered part 40a is formed near the front end of the transmission shaft 40 so that the diameter of the transmission shaft 40 becomes small from the rear side to the front side.

The output pulley 50 is arranged on the transmission shaft 40 and has a pair of sheaves. The output pulley 50 has a stationary sheave 51, a movable sheave 52 and the like.

The stationary sheave 51 is formed to be the same shape as the stationary sheave 21 by the same material as the stationary sheave 21. Namely, the stationary sheave 51 has a bushing part which is substantially cylindrical and a sheave part which is formed integrally at the front end of the bushing part and is circular and trapezoidal in sectional side view. A rear surface 51a of the sheave part of the stationary sheave 51 is formed as a slanted surface whose diameter becomes large from the rear side to the front side. On the axis of the stationary sheave 51, a through-hole 51b is formed which penetrates the stationary sheave 51 longitudinally. The inner peripheral surface of the through-hole 51b is tapered so that the diameter of the through-hole 51b becomes small from the rear side to the front side. The transmission shaft 40 is inserted into the through-hole 51b of the stationary sheave 51 from the rear side. The tapered part 40a of the transmission shaft 40 is engaged with the tapered through-hole 51b, whereby the stationary sheave 51 is fixed so as not to be rotatable relatively with respect to the transmission shaft 40 and not to be slidable.

By fixing the stationary sheave 51 to the transmission shaft 40 by the taper, the production cost can be reduced in comparison with fixation by a spline or a serration. Furthermore, play of the engagement of the stationary sheave 51 and the transmission shaft 40 can be solved, whereby change of the speed change ratio of the power with the belt-type stepless transmission 1 and reduction of durability of the connection surface between the belt 90 and the stationary sheave 51 can be prevented.

A groove is formed in each of the inner peripheral surface of the through-hole 51b and the outer peripheral surface of the tapered part 40a, and a woodruff key 51c is arranged in the groove. Accordingly, when the transmission shaft 40 and the stationary sheave 51 are going to be rotated relatively for any reason, the woodruff key 51c is engaged with the groove so as to prevent the relative rotation.

A locknut 51d is screwed on the transmission shaft 40 from the front side of the stationary sheave 51. Accordingly, the stationary sheave 51 can be prevented from sliding forward, whereby the stationary sheave 51 can be fixed to the transmission shaft 40 certainly.

The bushing part of the stationary sheave 51 is inserted into a bearing 51e and is supported via the bearing 51e so as to be rotatable with respect to the transmission casing (not shown).

As mentioned above, by separating the stationary sheave 51 and the transmission shaft 40 from each other, only the stationary sheave 51 can be replaced when the stationary sheave 51 is damaged, whereby part replacement cost can be reduced in comparison with the case in which the stationary sheave 51 and the transmission shaft 40 are constructed integrally. When the transmission shaft 40 and the stationary sheave 51 are formed by cutting processing, the uselessness of the cutting in the processing can be reduced in comparison with the case in which the stationary sheave 51 and the transmission shaft 40 are constructed integrally. Accordingly, the production cost can be reduced. In the case in which the belt-type stepless transmission 1 is used for a product whose number of production is large such as a motorcar, the production cost can be reduced by forming the stationary sheave 51 and the transmission shaft 40 integrally by forging with a mold because the mold cost can be collected easily. However, in the case in which the belt-type stepless transmission 1 is used for a product whose number of production is small such as a tractor according to this embodiment or another agricultural vehicle, construction vehicle or industrial vehicle, the production cost can be reduced by producing the stationary sheave 51 and the transmission shaft 40 separately from each other without any mold.

The movable sheave 52 is formed to be the same shape as the movable sheave 22 by the same material as the movable sheave 22. Namely, the movable sheave 52 has a bushing part which is substantially cylindrical and a sheave part which is formed integrally at the front end of the bushing part and is circular and trapezoidal. A front surface 52*a* of the sheave part of the movable sheave 52 is formed as a slanted surface whose diameter becomes large from the front side to the rear side. On the axis of the movable sheave 52, a through-hole 52*b* is formed which penetrates the movable sheave 52 longitudinally. The transmission shaft 40 is inserted into the through-hole 52*b* of the movable sheave 52 from the front side. The rear surface 51*a* of the sheave part of the stationary sheave 51 faces the front surface 52*a* of the sheave part of the movable sheave 52 on the input shaft 10, whereby the groove of the output pulley 50 is formed by the rear surface 51*a* and the front surface 52*a*. Grooves are formed on each of the inner peripheral surface of the through-hole 52*b* and the outer peripheral surface of the transmission shaft 40 along the axis of the transmission shaft 40, and steel balls 52*c* are arranged in the grooves. Accordingly, the movable sheave 52 is supported so as to be slidable along the axis of the transmission shaft 40 and so as not to be rotatable relatively with respect to the transmission shaft 40. Tapped holes 52*d* are formed in the rear surface of the sheave part of the movable sheave 52. The tapped holes 52*d* are formed at four positions along the perimeter of the movable sheave 52 at regular intervals.

In the present invention, the intervals between the tapped holes 52*d* are not limited to be regular, and the number of the tapped holes 52*d* is not limited to four.

As mentioned above, each of the stationary sheave 21 and the movable sheave 22 of the input pulley 20 and the stationary sheave 51 and the movable sheave 52 of the output pulley 50 are served by the same member, whereby the kinds of parts can be reduced, and in its turn the cost of the parts can be reduced.

The output shaft 60 is arranged coaxially with the transmission shaft 40. An outer cylinder 61 and an inner cylinder 62 are formed at the front end of the output shaft 60. The outer cylinder 61 is arranged while the axis of the outer cylinder 61 is along the longitudinal direction, and is formed as a closed-end cylinder whose front side is opened. The inner cylinder 62 is arranged in the outer cylinder 61 while the axis of the inner cylinder 62 is along the longitudinal direction, and is formed as a closed-end cylinder whose front side is opened. The axes of the outer cylinder 61 and the inner cylinder 62 are in agreement with each other, and each of the outer cylinder 61 and the inner cylinder 62 has a predetermined length in the longitudinal direction. A predetermined gap 61*a* is formed between the inner peripheral surface of the outer cylinder 61 and the outer peripheral surface of the inner cylinder 62. Tapped holes 63 (see FIG. 5) are formed in the front surface of the outer cylinder 61. The tapped holes 63 are formed at four positions along the perimeter of the outer cylinder 61.

In the present invention, the intervals between the tapped holes 63 are not limited to be regular, and the number of the tapped holes 63 is not limited to four.

The longitudinal middle portion of the output shaft 60 is inserted into a bearing 64 and is supported by the bearing 64 so as to be rotatable relatively with respect to the transmission casing (not shown).

In the inner cylinder 62 of the output shaft 60, the rear end of the transmission shaft 40 is supported so as to be rotatable relatively and not to be slidable. By supporting the transmission shaft 40 by the inner cylinder 62 having the predetermined length in the longitudinal direction, the transmission shaft 40 is prevented from tilting, whereby the transmission shaft 40 can be supported certainly on the same axis as the output shaft 60. Any member such as a bearing is not necessary to be arranged between the output shaft 60 and the transmission shaft 40, whereby the number of parts and the number of production processes can be reduced so as to reduce the production cost.

The spring 70 biases the tapped holes 52*d* forward. The spring 70 is arranged in the gap 61*a* between the outer cylinder 61 and the inner cylinder 62 of the output shaft 60. The rear end of the spring 70 touches the output shaft 60, and the front end of the spring 70 touches the rear end of the movable sheave 52. By the biasing force of the spring 70, the movable sheave 52 is biased forward, that is, biased so as to go close to the stationary sheave 51. By arranging the spring 70 in the gap 61*a* having the predetermined length in the longitudinal direction, the spring 70 is prevented from being bent and being shifted along the diametral direction of the output shaft 60.

As shown in FIGS. 4 to 7, the cam mechanism 80 enables transmission of torque between the output pulley 50 and the output shaft 60. The cam mechanism 80 has a sheave-side cam 81, a shaft-side cam 82 and the like.

The sheave-side cam 81 is substantially cylindrical. The sheave-side cam 81 is arranged so that the axis thereof is along the longitudinal direction and is in agreement with the axis of the transmission shaft 40. On the axis of the sheave-side cam 81, a through-hole 81*a* having a predetermined inner diameter is formed. In the front surface of the sheave-side cam 81, a plane perpendicular to the axis is formed. In the rear surface of the sheave-side cam 81, two first surfaces 81*b*, two second surfaces 81*c* and two third surfaces 81*d* perpendicular to the axis are formed.

Figure 5:
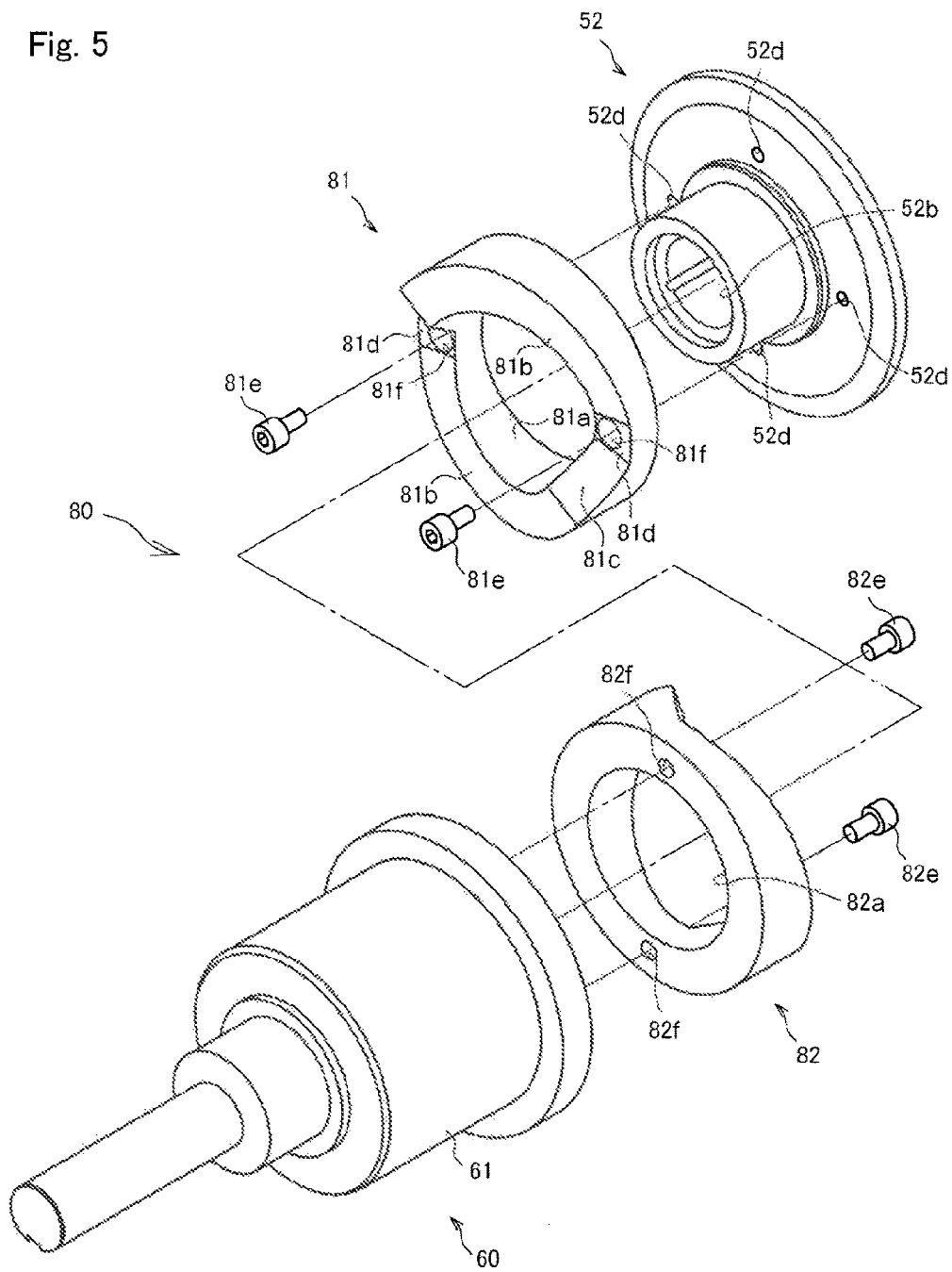
FIG. 5 A perspective view of attachment of a cam mechanism.
Figure 6:
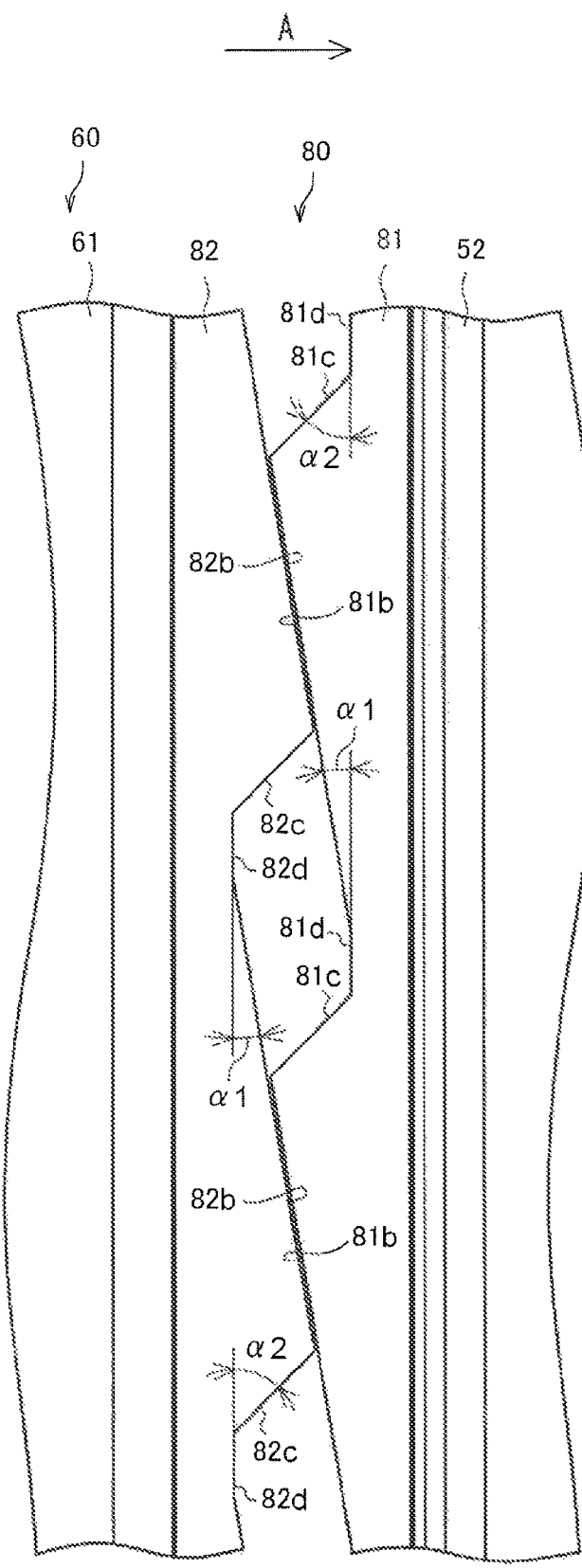
FIG. 6 A mimetic drawing of a contact part of a sheave-side cam and a shaft-side cam of the cam mechanism.
Figure 7:
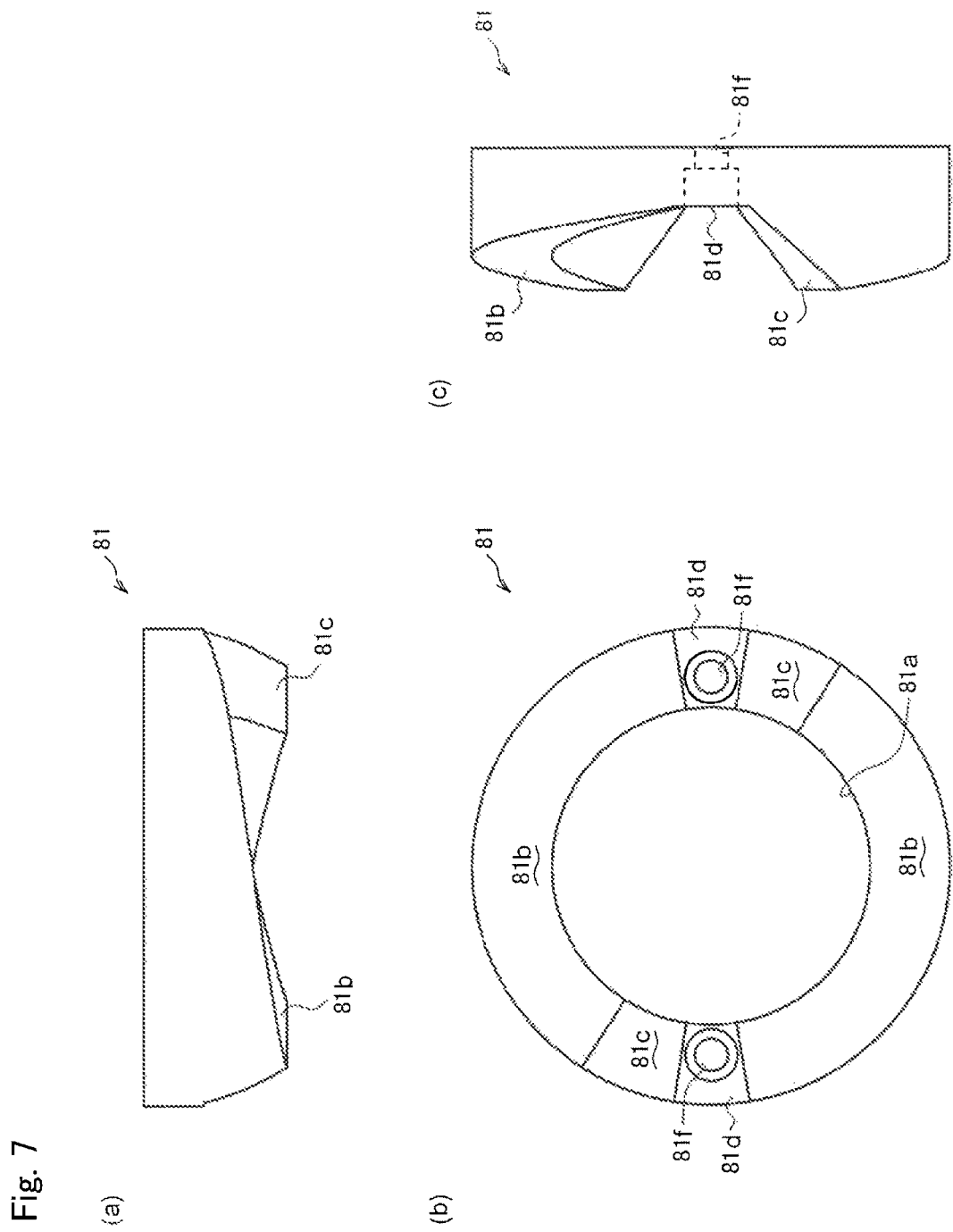
FIG. 7 A drawing of the sheave-side cam. (a) is a plan view, (b) is a front view, and (c) is a side view.

As shown in FIGS. 5 to 7, the first surfaces 81*b* are tilted for an angle $\alpha 1$ with respect to the third surfaces 81*d*. Namely, the distance between the front surface of the sheave-side cam 81 and the first surfaces 81*b* is increased from one side of the sheave-side cam 81 in the peripheral direction to the other side.

The second surfaces 81*c* are continuous from the other side of the first surfaces 81*b* and tilted for an angle $\alpha 2$ with respect to the third surfaces 81*d*. The second surfaces 81*c* are tilted oppositely to the first surfaces 81*b*, and the shortest distance between the front surface of the sheave-side cam 81 and the second surfaces 81*c* is increased from one side of the sheave-side cam 81 in the peripheral direction to the other side. Accordingly, the continuous part between the first surfaces 81*b* and the second surfaces 81*c* is projected rearward in the rear surface of the sheave-side cam 81. The angle $\alpha 2$ is set larger than the angle $\alpha 1$.

The third surfaces 81*d* are continuous from the one side of the first surfaces 81*b* and the other side of the second surfaces 81*c*, and is in parallel to the peripheral direction of the sheave-side cam 81, that is, in parallel to the front surface of the sheave-side cam 81. In the third surfaces 81*d*, two through-holes 81*f* are formed which penetrate the front and rear surfaces of the sheave-side cam 81.

In the rear surface of the sheave-side cam 81, the two first surfaces 81*b*, the two second surfaces 81*c* and the two third surfaces 81*d* are formed along the peripheral direction of the sheave-side cam 81 from the one side to the other side in the order of the first surface 81*b*, the second surface 81*c*, the third surface 81*d*, the first surface 81*b*, the second surface 81*c* and the third surface 81*d*.

As shown in FIGS. 4 and 5, the bush part of the movable sheave 52 is inserted into the through-hole 81*a* of the sheave-side cam 81 from the front side. The sheave part of the movable sheave 52 touches the front surface of the sheave-side cam 81 so as to make the through-holes 81*f* overlap the tapped holes 52*d*, and then two bolts 81*e* are screwed into the tapped holes 52*d* through the through-holes 81*f*, whereby the sheave-side cam 81 is fixed to the movable sheave 52. Accordingly, the tapped holes 52*d* of the movable sheave 52 (the tapped holes 22*d* of the movable sheave 22) can be employed not only for fixing the movable sheave 22 to the movable side cylinder casing 31 but also for fixing the movable sheave 52 to the sheave-side cam 81 as the same tapped holes 52*d* (the tapped holes 22*d*).

As shown in FIGS. 4 to 6, the shaft-side cam 82 is formed to the same shape by the same material as the sheave-side cam 81. Namely, the shaft-side cam 82 is arranged so that the axis thereof is along the longitudinal direction and is in agreement with the axis of the transmission shaft 40, and through-hole 82*a* having a predetermined inner diameter is formed on the axis. In the rear surface of the shaft-side cam 82, a plane perpendicular to the axis is formed. In the front surface of the shaft-side cam 82, two first surfaces 82*b*, two second surfaces 82*c* and two third surfaces 82*d* perpendicular to the axis are formed. The shapes of the first surfaces 82*b*, the second surfaces 82*c* and the third surfaces 82*d* are respectively the same as those of the first surfaces 81*b*, the second surfaces 81*c* and the third surfaces 81*d* of the sheave-side cam 81. In the third surfaces 82*d*, two through-holes 82*f* are formed which penetrate the front and rear surfaces of the shaft-side cam 82. In this embodiment, the number of each of the first surfaces 82*b*, the second surfaces 82*c* and the third surfaces 82*d* provided on the outer perimeter is two. However, the number may alternatively be three or more.

The transmission shaft 40 is inserted into the through-hole 82*a* of the shaft-side cam 82. The front surface of the outer cylinder 61 of the output shaft 60 touches the rear surface of the shaft-side cam 82 so as to make the through-holes 82*f* overlap the tapped holes 63, and then two bolts 82*e* are screwed into the tapped holes 63 through the through-holes 82*f*, whereby the shaft-side cam 82 is fixed to the output shaft 60. As a result, the rear surface of the sheave-side cam 81 faces the front surface of the shaft-side cam 82. Accordingly, the through-holes 82*f* of the shaft-side cam 82 (the through-holes 81*f* of the sheave-side cam 81) can be employed not only for fixing the sheave-side cam 81 to the movable sheave 52 but also for fixing the shaft-side cam 82 to the output shaft 60 as the same through-holes 82*f* (the through-holes 81*f*).

As mentioned above, the sheave-side cam 81 and the shaft-side cam 82 are served by the same member, whereby the kinds of parts can be reduced, and in its turn the cost of the parts can be reduced. By constructing the cam mechanism 80 only by the sheave-side cam 81 and the shaft-side cam 82 without any roller or spring, the arrangement between the output pulley 50 and the output shaft 60 can be made compact, whereby the structure can be simplified. Accordingly, the number of production processes can be reduced so as to reduce the production cost.

As shown in FIGS. 2 to 4, the belt 90 is wound around the groove of the input pulley 20 and the groove of the output pulley 50 so as to transmit the power of the input pulley 20 to the output pulley 50. The belt 90 is a metal belt including a band in which metal sheets are laminated and a metal element. The present invention is not limited thereto, and a belt of rubber, chain or resin may alternatively be used as the belt 90.

By pushing the movable sheave 22 toward the stationary sheave 21 by the hydraulic cylinder 30 with a predetermined power, the belt 90 wound around the groove of the input pulley 20 is pinched by the input pulley 20. By pushing the movable sheave 52 toward the stationary sheave 51 by the biasing force of the spring 70 or the like with a predetermined power, the belt 90 wound around the groove of the output pulley 50 is pinched by the output pulley 50.

Explanation will be given on the mode of power transmission in the belt-type stepless transmission 1 constructed as mentioned above.

When the input shaft 10 is rotated by the power from the engine, the input pulley 20 is rotated with the input shaft 10. When the input pulley 20 is rotated, the output pulley 50 is rotated via the belt 90. When the output pulley 50 is rotated, the sheave-side cam 81 fixed to the output pulley 50 is rotated. When the sheave-side cam 81 is rotated, the first surfaces 81*b* of the sheave-side cam 81 touch the first surfaces 82*b* of the shaft-side cam 82, and the shaft-side cam 82 is rotated following the rotation of the sheave-side cam 81. When the shaft-side cam 82 is rotated, the output shaft 60 is rotated and the power is outputted from the output shaft 60.

When the pressure oil is sent pressingly to the hydraulic chamber 33 so as to extend the hydraulic cylinder 30, the movable sheave 22 is slid rearward on the input shaft 10, whereby the distance between the front surface 21*a* of the stationary sheave 21 and the rear surface 22*a* of the movable sheave 22 (the width of groove of the input pulley 20) becomes narrow. When the width of groove of the input pulley 20 becomes narrow, the diameter of the belt 90 wound round the input pulley 20 is increased. Because the total length of the belt 90 is fixed, when the diameter of the belt 90 wound round the input pulley 20 is increased, the movable sheave 52 of the output pulley 50 is slid rearward oppositely to the biasing force of the spring 70 and the width of groove of the output pulley 50 is extended, whereby the diameter of the belt 90 wound round the output pulley 50 (hereinafter, simply referred to as "output pulley diameter") D becomes small. By extending the diameter of the belt 90 wound round the input pulley 20 so as to make the output pulley diameter D small, the speed change ratio of the belt-type stepless transmission 1 is shifted to the acceleration side.

When the pressure oil in the hydraulic chamber 33 is enabled to be discharged, by the forward component of the tension of the belt 90 wound round the input pulley 20, the movable sheave 22 is slid forward, whereby the width of groove of the input pulley 20 is extended. When the width of groove of the input pulley 20 is extended, the diameter of the belt 90 wound round the input pulley 20 becomes small. Because the total length of the belt 90 is fixed, when the diameter of the belt 90 wound round the input pulley 20 becomes small, the movable sheave 52 of the output pulley 50 is slid forward by the biasing force of the spring 70, whereby the width of groove of the output pulley 50 becomes narrow and the output pulley diameter D is increased. By making the diameter of the belt 90 wound round the input pulley 20 small so as to increase the output pulley diameter D, the speed change ratio of the belt-type stepless transmission 1 is shifted to the deceleration side.

Explanation will be given on the relation between the power of the movable sheave 52 of the output pulley 50 pressing the belt 90 toward the stationary sheave 51 (hereinafter, simply referred to as "pressing power") F and the torque transmitted by the belt-type stepless transmission 1 (hereinafter, simply referred to as "transmission torque") T.

Figure 8:
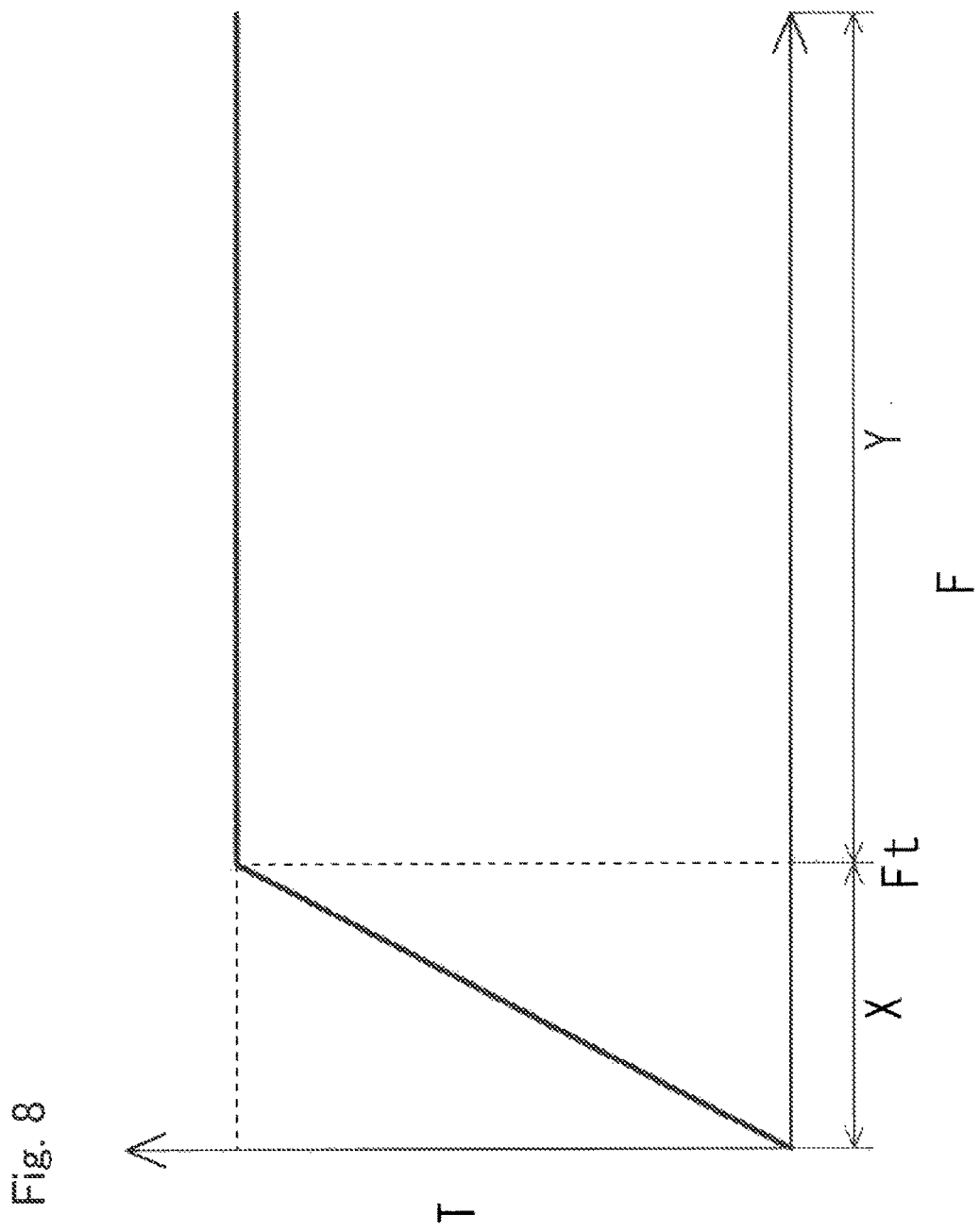
FIG. 8 A diagram of relation between an indentation power applied on an output pulley and a transmission torque.
Figure 9:
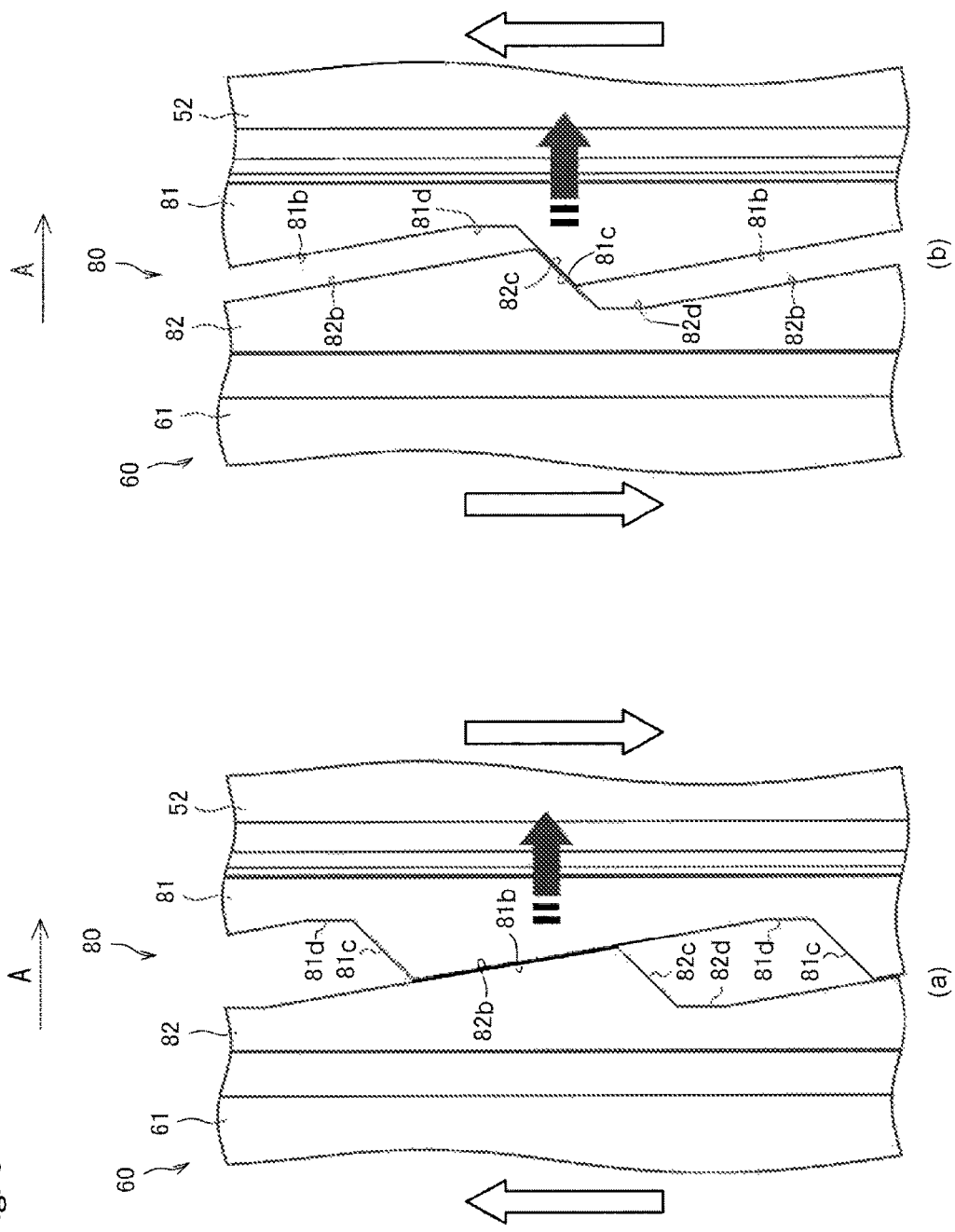
FIG. 9 A perspective view of the action of the cam mechanism. (a) is a drawing of transmission of torque from an input side to an output side. (b) is a drawing of transmission of torque from the output side to the input side.

As shown in FIG. 8, the pressing power F has an ideal value Ft.

In the range in which the pressing power F is smaller than the ideal value Ft (see X in FIG. 8), enough torque transmission cannot be performed with the belt-type stepless transmission 1. The pressing power F is insufficient for transmitting large torque, whereby slipping may occur between the belt 90 and the output pulley 50 so that the torque cannot be transmitted.

In the range in which the pressing power F is larger than the ideal value Ft (see Y in FIG. 8), the output pulley 50 pinches the belt 90 with the pressing power F excessive about the transmission torque T, whereby the belt 90 cannot be rotated smoothly and the loss of power occurs.

Then, for transmitting enough torque and transmitting the torque efficiently, the pressing power F should be as close to the ideal value Ft as possible.

The cam mechanism 80 in this embodiment can generate the pressing power F on the output pulley 50 corresponding to the torque transmitted from the sheave-side cam 81 to the shaft-side cam 82. In detail, a twist is generated between the sheave-side cam 81 and the shaft-side cam 82 corresponding to the torque transmitted by the cam mechanism 80 (see an outlined arrow in FIG. 9(*a*)). In this case, the first surfaces 81*b* of the sheave-side cam 81 touch the first surfaces 82*b* of the shaft-side cam 82, whereby the power is generated which separates the sheave-side cam 81 and the shaft-side cam 82 from each other following the touching surfaces. By moving the sheave-side cam 81 oppositely to the shaft-side cam 82 by the power, the movable sheave 52 is biased toward the stationary sheave 51. The movable sheave 52 is also biased toward the stationary sheave 51 by the spring 70, whereby the resultant force of the biasing force of the cam mechanism 80 and the biasing force of the spring 70 is the pressing power F of the output pulley 50.

FIG. 10(*a*) shows the relation between the output pulley diameter D and the pressing power F in the case in which the transmission torque T is small. In FIG. 10(*a*), Ft indicates an ideal value and Fr indicates an observed value. As shown in FIG. 10(*a*), the ideal value Ft is reduced following the increase of the output pulley diameter D.

When the transmission torque T is small, the twist generated between the sheave-side cam 81 and the shaft-side cam 82 is small, whereby the power of the cam mechanism 80 biasing the movable sheave 52 is small.

In this case, when the width of groove of the input pulley 20 is extended by actuating the hydraulic cylinder 30, the movable sheave 52 of the output pulley 50 is slid toward the stationary sheave 51, whereby the width of groove of the output pulley 50 becomes narrow. Namely, the output pulley diameter D is increased. In this case, the movable sheave 52 is slid oppositely to the output shaft 60, whereby the total length of the spring 70 is extended. Accordingly, the power of the spring 70 biasing the movable sheave 52 becomes small, whereby the pressing power F becomes small following the increase of the output pulley diameter D.

As mentioned above, the biasing force of the spring 70 becomes small following the increase of the output pulley diameter D, whereby the observed value Fr changes following the ideal value Ft. Accordingly, the observed value Fr of the pressing power F can be made close to the ideal value Ft corresponding to the output pulley diameter D, whereby enough torque can be transmitted and the torque can be transmitted efficiently.

FIG. 10(*b*) shows the relation between the output pulley diameter D and the pressing power F in the case in which the transmission torque T is large. As shown in FIG. 10(*b*), the ideal value Ft is reduced following the increase of the output pulley diameter D. In the case in which the transmission torque T is large, the ideal value Ft is larger than that of the case in which the transmission torque T is small (see FIG. 10(*a*)). However, the biasing force of the cam mechanism 80 is also large corresponding to the transmission torque T, whereby the observed value Fr is also large. Accordingly, in the case in which the transmission torque T is large, the observed value Fr of the pressing power F can also be made close to the ideal value Ft, whereby enough torque can be transmitted and the torque can be transmitted efficiently.

When the transmission torque T is large, the twist generated between the sheave-side cam 81 and the shaft-side cam 82 is large, whereby the power of the cam mechanism 80 biasing the movable sheave 52 is large.

In this case, when the width of groove of the input pulley 20 is extended by actuating the hydraulic cylinder 30, the movable sheave 52 of the output pulley 50 is slid toward the stationary sheave 51, whereby the width of groove of the output pulley 50 becomes narrow. In this case, the movable sheave 52 is slid oppositely to the output shaft 60, whereby the total length of the spring 70 is extended. Accordingly, the power of the spring 70 biasing the movable sheave 52 becomes small, whereby the pressing power F becomes small following the increase of the output pulley diameter D.

As mentioned above, the biasing force of the spring 70 becomes small following the increase of the output pulley diameter D, whereby the observed value Fr changes following, the ideal value Ft. Accordingly, the observed value Fr of the pressing power F can be made close to the ideal value Ft corresponding to the output pulley diameter D, whereby enough torque can be transmitted and the torque can be transmitted efficiently. When the power transmission is stopped, that is, when the transmission torque T becomes not to be applied on the cam mechanism 80, only the biasing force of the spring 70 is the pressing power F of the output pulley 50, and the movable sheave 52 of the output pulley 50 returns to the axial position corresponding to this pressing power F.

As mentioned above, the cam mechanism 80 applying the pressing power F on the output pulley 50 corresponding to the transmission torque T can be constructed easily without any member such as a roller or an elastic member. Accordingly, the production cost can be reduced.

The cam mechanism 80 in this embodiment can transmit the torque from the output shaft 60 the input shaft 10 in the case in which an engine brake is actuated or the like. As shown in FIGS. 2 to 4, when the engine brake is actuated while traveling, the shaft-side cam 82 is rotated together with the output shaft 60. When the shaft-side cam 82 is rotated, the second surfaces 82*c* of the shaft-side cam 82 touch the second surfaces 81*c* of the sheave-side cam 81, whereby the sheave-side cam 81 is rotated following the rotation of the shaft-side cam 82. When the sheave-side cam 81 is rotated, the output pulley 50 is rotated. When the output pulley 50 is rotated, the input pulley 20 is rotated via the belt 90. The input shaft 10 is rotated following the rotation of the input pulley 20 and the rotation rotates the engine, whereby the engine brake is actuated.

In this case, the cam mechanism 80 can also generate the pressing power F on the output pulley 50 corresponding to the torque transmitted from the sheave-side cam 81 to the shaft-side cam 82. In detail, a twist is generated between the sheave-side cam 81 and the shaft-side cam 82 corresponding to the torque transmitted by the cam mechanism 80 (see an outlined arrow in FIG. 9(b)). In this case, the second surfaces 82c of the shaft-side cam 82 touch the second surfaces 81c of the sheave-side cam 81, whereby the power is generated which separates the shaft-side cam 82 and the sheave-side cam 81 from each other following the touching surfaces. By moving the sheave-side cam 81 oppositely to the shaft-side cam 82 by the power, the movable sheave 52 is biased toward the stationary sheave 51. The movable sheave 52 is also biased toward the stationary sheave 51 by the spring 70, whereby the resultant force of the biasing force of the cam mechanism 80 and the biasing force of the spring 70 is the pressing power F of the output pulley 50.

As mentioned above, by forming the first surfaces 81b and the other side of the second surfaces 81c in the sheave-side cam 81 and forming the first surfaces 82b and the other side of the second surfaces 82c in the shaft-side cam 82, the pressing power F can be applied on the output pulley 50 following not only the torque transmitted from the input shaft 10 to the output shaft 60 but also the torque transmitted from the output shaft 60 to the input shaft 10.

Explanation will be given on the operation mode in the case in which a large torque is applied instantaneously on the belt-type stepless transmission 1 constructed as mentioned above.

In a tractor or the like having the belt-type stepless transmission 1, an instantaneous large torque (hereinafter, simply referred to as "peak torque") may be applied on the belt-type stepless transmission 1. For example, the case in which a bucket of a front loader is thrust into earth at the time of the work with the front loader is so. In this case, the peak torque is applied on axles supporting wheels, in its turn, the peak torque is applied on the belt-type stepless transmission 1. In this case, without pinching the belt 90 wound round the output pulley 50 with a large pressing power F corresponding to the peak torque, the slip may occur between the belt 90 and the output pulley 50, whereby the torque cannot be transmitted.

In such the case in which the peak torque is generated, the cam mechanism 80 in this embodiment can generate the pressing power F on the output pulley 50 corresponding to the peak torque. In detail, corresponding to the peak torque, a twist is generated between the sheave-side cam 81 and the shaft-side cam 82 corresponding to the peak torque (see an outlined arrow in FIG. 9(a)). In this case, the first surfaces 81b of the sheave-side cam 81 touch the first surfaces 82b of the shaft-side cam 82, whereby the power is generated which separates the sheave-side cam 81 and the shaft-side cam 82 from each other following the touching surfaces. By moving the sheave-side cam 81 oppositely to the shaft-side cam 82 by the power, the movable sheave 52 is biased toward the stationary sheave 51. Accordingly, when the peak torque is generated, the pressing power F of the output pulley 50 is increased.

Accordingly, when the peak torque is generated, the cam mechanism 80 can increase the pressing power F of the output pulley 50, whereby the slip between the belt 90 and the output pulley 50 can be prevented and the belt-type stepless transmission 1 can transmit the torque.

When the peak torque is large, the twist between the sheave-side cam 81 and the shaft-side cam 82 is also large, whereby the pressing power F of the output pulley 50 can be increased more widely. Similarly, when the peak torque is small, the twist between the sheave-side cam 81 and the shaft-side cam 82 is also small, whereby the pressing power F of the output pulley 50 can be increased slightly. Accordingly, the pressing power F of the output pulley 50 can be controlled corresponding to the value of the peak torque, whereby the belt-type stepless transmission 1 can transmit enough torque and can transmit the torque efficiently.

By employing the cam mechanism 80 as this embodiment, the pressing power F of the output pulley 50 can be increased at the moment at which the peak torque is generated. Accordingly, the response is quicker than that of the case in which the pressing power F of the output pulley 50 is increased by hydraulic control or the like, and the slip between the belt 90 and the output pulley 50 can be prevented certainly.

The shape of each of the first surfaces 81b and 82b and the second surfaces 81c and 82c is not limited to that of this embodiment which is a curved surface without unevenness. Namely, the shape of each of the first surfaces 81b and 82b and the second surfaces 81c and 82c should only be able to apply the pressing power F corresponding to the transmission torque T on the output pulley 50. Especially, for applying the pressing power F corresponding to the transmission torque T on the output pulley 50, the shape of each of the first surfaces 81b and 82b and the second surfaces 81c and 82c preferably has little unevenness.

In this embodiment, the sheave-side cam 81 of the cam mechanism 80 has the first surfaces 81b, the second surfaces 81c and the third surfaces 81d, and the shaft-side cam 82 of the cam mechanism 80 has the first surfaces 82b, the second surfaces 82c and the third surfaces 82d. However, the present invention is not limited thereto. Namely, the shape of each of the cams should only be able to apply the pressing power F corresponding to the transmission torque T on the output pulley 50.

In this embodiment, the cam mechanism 80 is arranged at the side of the output pulley 50. However, the present invention is not limited thereto, and the cam mechanism 80 may alternatively be arranged at the side of the input pulley 20 or at both the side of the input pulley 20 and the side of the output pulley 50.

As mentioned above, the belt-type stepless transmission 1 includes the input shaft 10, the input pulley 20 having the stationary sheave 21 fixed to the input shaft 10 and the movable sheave 22 supported on the input shaft 10 so as to be slidable along the axis of the input shaft 10 and so as not to be rotatable relatively with respect to the input shaft 10, the transmission shaft 40 arranged in parallel to the input shaft 10, the output pulley 50 having the stationary sheave 51 fixed to the transmission shaft 40 and the movable sheave 52 supported on the transmission shaft 40 so as to be slidable along the axis of the transmission shaft 40 and so as not to be rotatable relatively with respect to the transmission shaft 40, the belt 90 wound round the input pulley 20 and the output pulley 50, the output shaft 60 arranged on the same axis as the transmission shaft 40, and the cam mechanism 80 which has the sheave-side cam 81 fixed to the movable sheave 52 and the shaft-side cam 82 fixed to the output shaft 60 and makes the sheave-side cam 81 and the shaft-side cam 82 touch with each other so as to enable the transmission of torque between the movable sheave 52 and the output shaft 60 and to apply the biasing force corresponding to the torque on the movable sheave 52.

According to the construction, the cam mechanism 80 applying the biasing force corresponding to the transmission torque on the movable sheave 52 can be constructed easily.

The sheave-side cam 81 and the shaft-side cam 82 respectively have the first surfaces 81b and 82b which are slanted for the angle α1 with respect to the plane perpendicular to the axis of the transmission shaft 40 and can touch with each other via the first surfaces 81b and 82b.

According to the construction, the sheave-side cam 81 and the shaft-side cam 82 can be formed easily, whereby the production cost can be reduced.

The sheave-side cam 81 and the shaft-side cam 82 respectively have the second surfaces 81c and 82c which are slanted oppositely to the first surfaces 81b and 82b with respect to the plane perpendicular to the axis of the transmission shaft 40 and can touch with each other via the second surfaces 81c and 82c.

According to the construction, the biasing force corresponding to the transmission torque T of each of forward and rearward rotational directions can be applied on the movable sheave 52. The biasing forces applied on the movable sheave 52 at the time of the forward and rearward rotation can be set optionally respectively by changing the slant angle of the first surfaces 81b and 82b and the second surfaces 81c and 82c. The cam mechanism 80 applying the biasing force corresponding to the transmission torque T of both the rotational directions on the movable sheave 52 can be constructed easily.

The sheave-side cam 81 and the shaft-side cam 82 are constructed by the one member.

According to the construction, the sheave-side cam 81 and the shaft-side cam 82 are served by the same member, whereby the part cost can be reduced.

On the other hand, conventionally, an art of a belt-type stepless transmission is known in which a belt is wound round a pair of pulley whose widths of grooves are variable so as to transmit power.

As the belt-type stepless transmission, a transmission is known which has a pulley having a stationary sheave formed integrally with a shaft and a movable sheave slidably supported on the shaft. In this construction, by changing the position of the movable sheave on the axial direction, the speed change ratio of the belt-type stepless transmission can be controlled.

In the belt-type stepless transmission, the stationary sheave formed integrally with the shaft. Then, for example in the case in which the stationary sheave and the shaft are formed by cutting processing, much uselessness of cutting at the processing is caused, whereby the production cost is increased disadvantageously. In the case of forming the stationary sheave and the shaft integrally by forging with a mold, the belt-type stepless transmission for a product whose number of production is large such as a motorcar can recover the cost of the mold easily. However, the belt-type stepless transmission for a product whose number of production is small such as construction vehicle cannot recover the cost of the mold easily and the production cost is increased, whereby the belt-type stepless transmission described in the Patent Literature 1 is disadvantageous.

Contrarily, the belt-type stepless transmission 1 according to the embodiment includes the two shafts arranged in parallel to each other (the input shaft 10 and the transmission shaft 40), the input pulley 20 having the stationary sheave 21 fixed to the input shaft 10 and the movable sheave 22 supported on the input shaft 10 so as to be slidable along the axis of the input shaft 10 and so as not to be rotatable relatively with respect to the input shaft 10, the output pulley 50 having the stationary sheave 51 fixed to the transmission shaft 40 and the movable sheave 52 supported on the transmission shaft 40 so as to be slidable along the axis of the transmission shaft 40 and so as not to be rotatable relatively with respect to the transmission shaft 40, and the belt 90 wound round the two pulleys. The stationary sheave 21 of the input pulley 20 and the stationary sheave 51 of the output pulley 50 are formed separately respectively from the corresponding shafts (the input shaft 10 and the transmission shaft 40).

According to the construction, in the case in which the shafts (the input shaft 10 and the transmission shaft 40) and the stationary sheaves (the stationary sheave 21 and the stationary sheave 51) are formed by cutting processing, the uselessness of cutting can be reduced. Accordingly, compared with the case of forming the shaft and the stationary sheave integrally, the production cost can be reduced. In the case of producing relative small number of the belt-type stepless transmissions 1, the separate forming of the stationary sheave and the shaft can reduce the production cost further than the integral forming of the stationary sheave and the shaft. Furthermore, when the pulleys (the input pulley 20 and the output pulley 50) should be exchanged, the exchange can be performed for every sheave, whereby the part cost can be reduced in comparison with the case of forming the shaft and the stationary sheave integrally.

The stationary sheaves (the stationary sheave 21 and the stationary sheave 51) are fixed to the corresponding shafts so as not to be rotatable relatively by engaging the through-holes 21b and 51b having the tapered inner peripheral surfaces with the tapered parts 10a and 40a formed on the outer peripheral surfaces of the shafts.

According to the construction, the production cost can be reduced in comparison with the case of fixing the stationary sheaves (the stationary sheave 21 and the stationary sheave 51) to the shafts (the input shaft 10 and the transmission shaft 40) with a spline or a serration.

The two stationary sheaves (the stationary sheave 21 and the stationary sheave 51) are constructed by the same member.

According to the construction, the two stationary sheaves (the stationary sheave 21 and the stationary sheave 51) are served by the same member, whereby the part cost can be reduced.

The two movable sheaves (the movable sheave 22 and the movable sheave 52) are constructed by the same member.

According to the construction, the two movable sheaves (the movable sheave 22 and the movable sheave 52) are served by the same member, whereby the part cost can be reduced.

On the other hand, conventionally, an art of a belt-type stepless transmission is known in which a belt is wound round a pair of pulley whose widths of grooves are variable so as to transmit power.

As the belt-type stepless transmission, a transmission is known which has a pulley having a stationary sheave formed integrally with a first shaft and a movable sheave slidably supported on the first shaft, a spring biasing the movable sheave toward the stationary sheave, a second shaft arranged on the same axis as the first shaft, and a cam mechanism which enables power transmission between the movable sheave and the second shaft. In this construction, the rotational power of the pulley is transmitted via the cam mechanism to the second shaft.

However, in the belt-type stepless transmission, since the second shaft is supported via a bearing so as to be rotatable relatively to the first shaft and a projection is formed so as to engage the cam mechanism with the second shaft, the construction is complicated, whereby the production cost may be increased disadvantageously.

Contrarily, the belt-type stepless transmission 1 according to the embodiment includes the transmission shaft 40, the output pulley 50 having the stationary sheave 51 fixed to the transmission shaft 40 and the movable sheave 52 supported on the transmission shaft 40 so as to be slidable along the axis of the transmission shaft 40 and so as not to be rotatable relatively with respect to the transmission shaft 40, the output shaft 60 arranged on the same axis as the transmission shaft 40, the cam mechanism 80 which is interposed between the movable sheave 52 and the output shaft 60, enables the power transmission between the movable sheave 52 and the output shaft 60, and applies the pressing power along the axial direction corresponding to the torque on the movable sheave 52, and the spring 70 biasing the movable sheave 52 toward the stationary sheave 51. The output shaft 60 has double cylinder construction including the inner cylinder 62 and the outer cylinder 61 surrounding the inner cylinder 62. One of the sides of the transmission shaft 40 is inserted into the inner cylinder 62 and supported so as to be rotatable, and the spring 70 is inserted between the outer cylinder 61 and the inner cylinder 62 and supported so as to be able to extend and retract along the axial direction.

According to the construction, the structure between the output pulley 50 and the output shaft 60 can be made easy. Accordingly, the production cost and the trouble of production can be reduced. The spring 70 and the transmission shaft 40 are arranged along the output shaft 60. Accordingly, the spring 70 and the transmission shaft 40 can be supported stably.

The cam mechanism 80 includes the sheave-side cam 81 and the shaft-side cam 82 touching the sheave-side cam 81. The sheave-side cam 81 and the shaft-side cam 82 are engaged with the outer side of the transmission shaft 40 so as to be rotatable relatively. The sheave-side cam 81 is fixed to the movable sheave 52, and the shaft-side cam 82 is fixed to the outer cylinder 61 of the output shaft 60.

According to the construction, the cam mechanism 80 can be arranged compactly between the output pulley 50 and the output shaft 60 so as to make the construction between the output pulley 50 and the output shaft 60 easy. Accordingly, the production cost and the trouble of production can be reduced.

INDUSTRIAL APPLICABILITY

The present invention can be employed for an art of a belt-type stepless transmission in which a belt is wound round a pair of pulleys whose widths of grooves are variable so as to transmit power. In more detail, the present invention can be employed for an art of a belt-type stepless transmission having a cam mechanism which controls a pressing power of pulleys on a belt corresponding to a transmitted torque.

The invention claimed is:

1. A belt-type stepless transmission, comprising:
a first shaft;
a first pulley having a first stationary sheave fixed to the first shaft and a first movable sheave supported on the first shaft so as to be slidable along the axis of the first shaft and so as not to be rotatable relative to the first shaft;
a second shaft arranged in parallel to the first shaft;
a second pulley having a second stationary sheave fixed to the second shaft and a second movable sheave supported on the second shaft so as to be slidable along the axis of the second shaft and so as not to be rotatable relative to the second shaft;
a belt wound round the first pulley and the second pulley;
a third shaft arranged coaxially to the second shaft;
a cam mechanism which has a sheave-side cam fixed to the second movable sheave and a shaft-side cam fixed to the third shaft and makes the sheave-side cam and the shaft-side cam touch with each other so as to enable transmission of a torque between the second movable sheave and the third shaft and to apply a biasing force corresponding to the torque on the second movable sheave; and
a spring contacting the second movable sheave at one end thereof so as to bias the second movable sheave toward the second stationary sheave,
wherein the third shaft has an inner cylinder and an outer cylinder surrounding the inner cylinder at a distance along a radial direction so as to have a space between the inner and outer cylinders,
wherein an axial end portion of the second shaft is inserted into the inner cylinder and is guided and supported so as to be rotatable relative to the third shaft, and
wherein the spring is inserted at the other end thereof into the space between the outer cylinder and the inner cylinder and is supported by the third shaft so as to be able to extend and retract along the axial direction along with the axial movement of the second movable sheave relative to the second shaft.

2. The belt-type stepless transmission according to claim 1, wherein the shaft-side cam is formed in a ring-like shape so as to be able to have the spring inserted thereinto and is fixed to an end of the outer cylinder of the third shaft.

* * * * *